(12) United States Patent
Yu et al.

(10) Patent No.: US 10,592,184 B2
(45) Date of Patent: Mar. 17, 2020

(54) METHOD AND DEVICE FOR PARSING TABLES IN PDF DOCUMENT

(71) Applicant: ABC FINTECH CO., LTD., Beijing (CN)

(72) Inventors: Zhou Yu, Beijing (CN); Yongzhi Yang, Beijing (CN); Xian Wang, Beijing (CN)

(73) Assignee: ABC FINTECH CO., LTD., Beijing (CN)

( * ) Notice: Subject to any disclaimer, the term of this patent is extended or adjusted under 35 U.S.C. 154(b) by 0 days.

(21) Appl. No.: 15/984,224

(22) Filed: May 18, 2018

(65) Prior Publication Data

US 2019/0294399 A1 Sep. 26, 2019

(30) Foreign Application Priority Data

Mar. 26, 2018 (CN) .......................... 2018 1 0254092

(51) Int. Cl.
*G06F 3/12* (2006.01)
*G06K 9/00* (2006.01)
*G06K 9/62* (2006.01)

(52) U.S. Cl.
CPC ....... *G06F 3/1298* (2013.01); *G06K 9/00456* (2013.01); *G06K 9/00469* (2013.01); *G06K 9/6288* (2013.01)

(58) Field of Classification Search
CPC combination set(s) only.
See application file for complete search history.

(56) References Cited

U.S. PATENT DOCUMENTS

2008/0028291 A1* 1/2008 Vion-Dury ......... G06K 9/00449
715/228
2017/0220858 A1* 8/2017 Stitz ...................... G06F 17/246

\* cited by examiner

*Primary Examiner* — Christopher Wait
(74) *Attorney, Agent, or Firm* — Morgan, Lewis & Bockius LLP

(57) ABSTRACT

The present application relates to a method performed at an electronic device for parsing tables in a PDF document. The method includes the following steps: receiving the PDF document containing a table area; extracting horizontal lines, vertical lines and text blocks in the table area; determining the types of tables in the table area according to the extracted horizontal lines and vertical lines; if the table is a quasi full-line table, determining the structure of the quasi full-line table in the table area according to the horizontal lines and the vertical lines in the table area with the assistance of the text blocks in the table area; and if the table is a quasi non-line table, determining the structure of the quasi non-line table in the table area according to the text blocks in the table area with the assistance of the horizontal lines and/or the vertical lines in the table area.

18 Claims, 11 Drawing Sheets

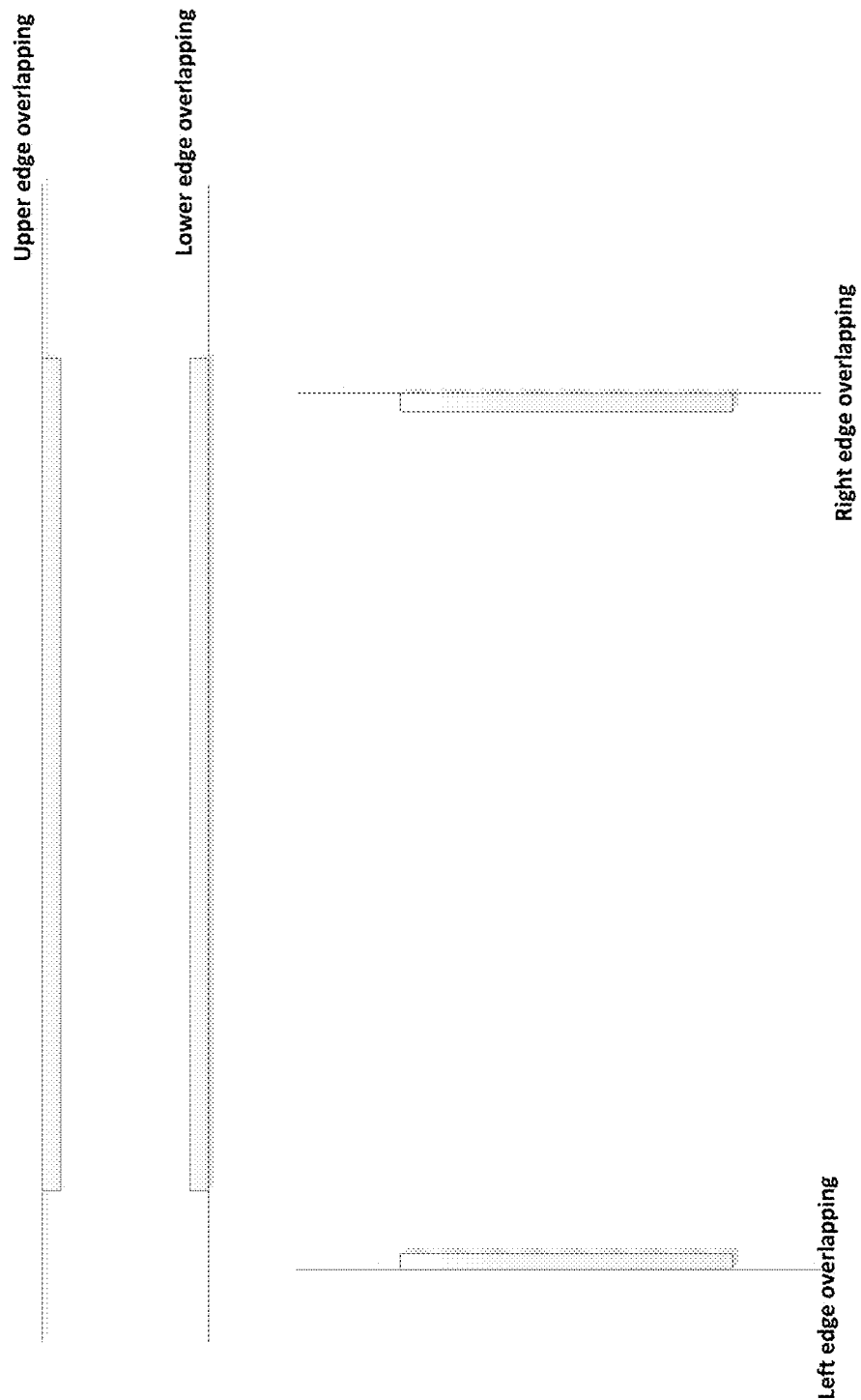

METHOD AND DEVICE FOR PARSING TABLES IN PDF DOCUMENT

CROSS-REFERENCE TO RELATED APPLICATION

This application claims the benefit of Chinese Patent Application No. 201810254092.4, filed Mar. 26, 2018 with State Intellectual Property Office, the People's Republic of China, the entire content of which is incorporated by reference herein.

TECHNICAL FIELD

The present application relates to the technical field of data processing, and particularly, relates to a method and device for parsing tables in a PDF document.

BACKGROUND

A PDF document is based on a PostScript language image model, and for any printer, the PDF may faithfully reproduce every character, color and image of the manuscript. Due to the inherent feature that the PDF is irrelevant to the operating system platform, PDF is the most widely used ideal document format for electronic document distribution and digital information dissemination.

Although the PDF document may accurately display the layout, the structural information in the PDF, in particular the table information, has not been effectively recorded and stored, resulting in difficulty in restoring the table information in the PDF. One of the currently used methods is to directly collect a cutting area in the table area from the current page, perform some filtering processing on the cutting area, remove duplicated and invalid cutting areas and convert the remaining cutting areas into corresponding cells according to 1:1. The disadvantage of this method is that the cutting areas may be incomplete, resulting in the absence of parsed cells; the cutting areas may have the case that the area is wrongly encircled, for example, one cutting area is sliced into two cutting areas or two cutting areas are synthesized into one cutting area, resulting in wrong parsed cells. Aiming at the disadvantages of the above method, another method is to obtain the cells in the table area via a line-based method for both word and non-word generated PDFs, that is, to collect all horizontal lines and vertical lines in the table area at first, obtain intersection points of all horizontal and vertical lines, record the coordinate information (including the x direction and the y direction) of the corresponding points, and determine four points of the cell according to the information of all coordinate points to obtain the final cell. However, due to possible errors in the drawn line, the obtained cell may be missing.

SUMMARY

The objective of the present application is to provide a method and device for parsing tables in a PDF document, in order to overcome the defects of relatively poor table vector parsing accuracy of the existing methods.

In order to fulfill the above objective, the embodiments of the present application provide the following technical solutions:

In one aspect, an embodiment of the present application provides a method for parsing tables in a PDF document, including the following steps:

receiving the PDF document containing a table area;

extracting horizontal lines, vertical lines and text blocks in the table area;

determining the types of tables in the table area according to the extracted horizontal lines and vertical lines, wherein the type includes a quasi full-line table and a quasi non-line table;

if the table is the quasi full-line table, determining the structure of the quasi full-line table in the table area according to the horizontal lines and the vertical lines in the table area with the assistance of the text blocks in the table area; and if the table is the quasi non-line table, determining the structure of the quasi non-line table in the table area according to the text blocks in the table area with the assistance of the horizontal lines and/or the vertical lines in the table area.

In another aspect, an embodiment of the present application provides a device for parsing tables in a PDF document, including:

a document receiving module, configured to receive the PDF document containing a table area:

a line extraction module, configured to extract horizontal lines and vertical lines in the table area:

a table type determining module, configured to determine the types of tables in the table area according to the extracted horizontal lines and vertical lines, wherein the type includes a quasi full-line table and a quasi non-line table;

a first structure determining module configured to, if the table is the quasi full-line table, determine the structure of the quasi full-line table in the table area according to the horizontal lines and the vertical lines in the table area with the assistance of the text blocks in the table area; and a second structure determining module configured to, if the table is the quasi non-line table, determine the structure of the quasi non-line table in the table area according to text blocks in the table area with the assistance of the horizontal lines and/or the vertical lines in the table area.

In another aspect, an embodiment of the present application provides a non-transitory computer readable storage medium including computer readable instructions, wherein a processor executes the operations in the method of the embodiment of the present application when the computer readable instructions are executed.

In another aspect, an embodiment of the present application provides an electronic equipment, including: a memory, configured to store program instructions; and a processor, connected with the memory, and configured to execute the program instructions in the memory to implement the steps of the method in the embodiment of the present application.

Compared with the prior art, the present application has the beneficial effects that according to the method and the device of the present application, the type of the table is determined at first, and then row-and-column index information of the table is determined according to the type of the table, which is pertinent, and as the row-and-column index information is determined in combination with the lines and the text blocks, extremely high accuracy can be achieved for the quasi full-line table, very high accuracy can also be achieved for the quasi non-line table, the requirements of productization are satisfied, and the parsing speed is high.

BRIEF DESCRIPTION OF THE DRAWINGS

In order to illustrate the technical solutions in the embodiments of the present application more clearly, a brief introduction will be made below to the drawings required in the embodiments. It should be understood that the drawings described only show some embodiments of the present application and should not be regarded as limit to the scope, and other relevant drawings could be obtained based on these drawings by those of ordinary skill in the art without any creative efforts.

FIGS. 5a-c are respectively schematic diagrams of several conditions of repeated extraction of lines according to some embodiments of the present application.

DETAILED DESCRIPTION OF THE EMBODIMENTS

Figure 1:
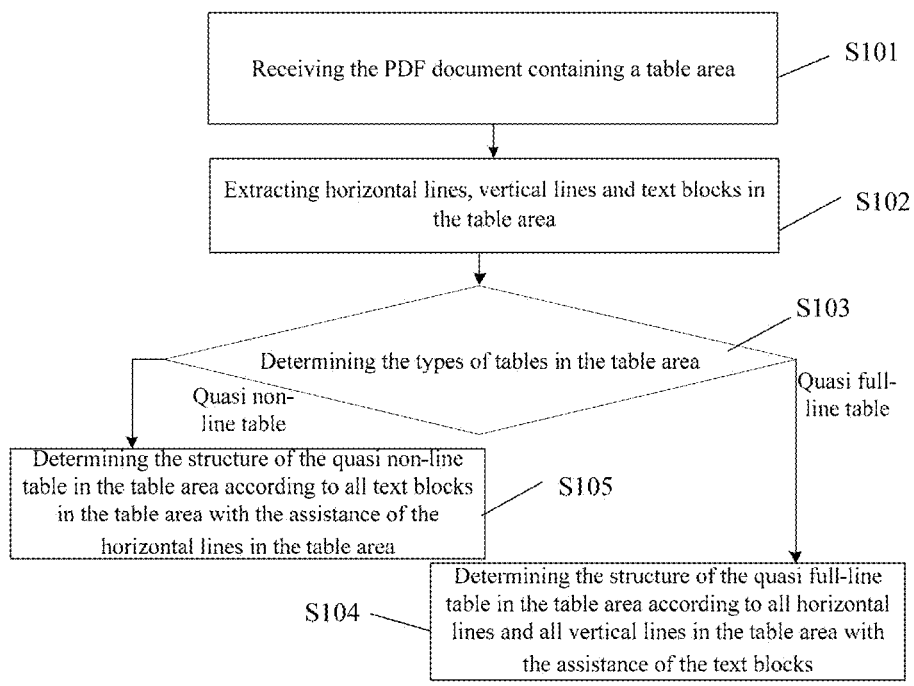
FIG. 1 is a flow diagram of a method for parsing tables in a PDF document according to some embodiments of the present application.

A clear and complete description will be made to the technical solutions in the embodiments of the present application below in combination with the drawings in the embodiments of the present application. Apparently, the embodiments described are only part of the embodiments of the present application, not all of them. Generally, the components of the embodiments of the present application described and shown in the drawings here may be arranged and designed with various different configurations. Therefore, the detailed description of the embodiments of the present application provided in the drawings below is not intended to limit the protection scope of the present application, but only indicates the selected embodiments of the present application. All other embodiments obtained by those skilled in the art without creative efforts based on the embodiments of the present application shall fall within the protection scope of the present application.

Figure 2:
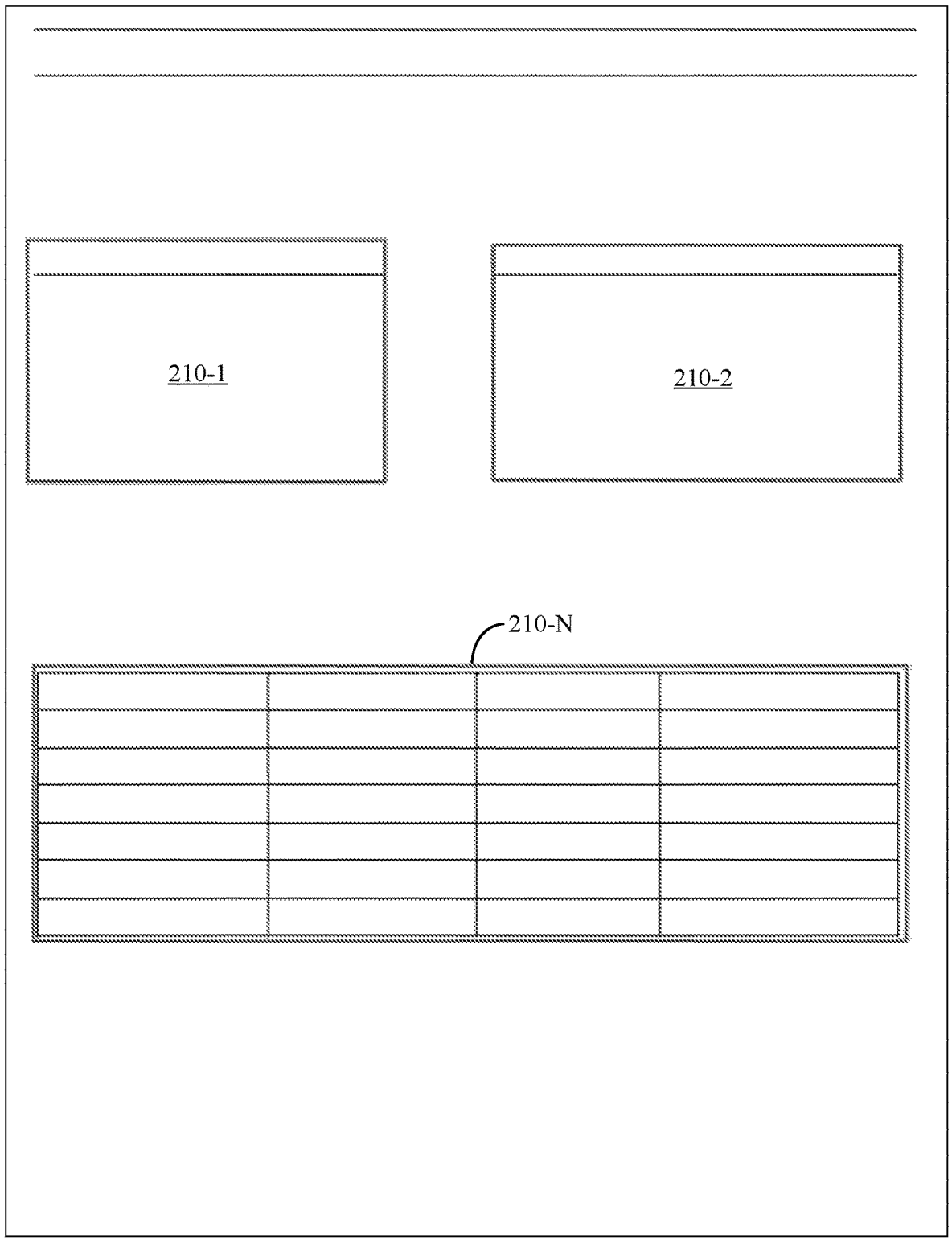
FIG. 2 is a PDF document in which a table area has been determined.

Referring to FIG. 1, a method for parsing tables in a PDF document provided by this embodiment includes the following steps:

S101, receive a to-be-processed PDF document, wherein the to-be-processed PDF document here is a PDF document containing the table area, (e.g., 210-1, 210-2, . . . , 210-N), as shown in FIG. 2.

S102, extract horizontal lines, vertical lines and text blocks in the table area from the to-be-processed PDF document.

In this step, as an example of an implementable manner, all path drawing information in a PDF page may be extracted and merged into a line, that is, line segments of table lines are screened out from the PDF vector stream, and then the screened out line segments having closer distances and a consistent direction are merged into a line. The table lines in the PDF page are stored by using the vector stream path information and have the characteristics of being "fine, flat and long"; according to these characteristics, the line segments satisfying the requirements in the PDF vector stream may be extracted and screened out, the table line of the PDF is not a complete line in the vector stream, but is composed of a plurality of line segments, therefore, the screened out line segments having the closer distance and the consistent direction may be merged into an entire line, and then horizontal lines and vertical lines are selected from the obtained line according to the direction of the line.

Figure 3:
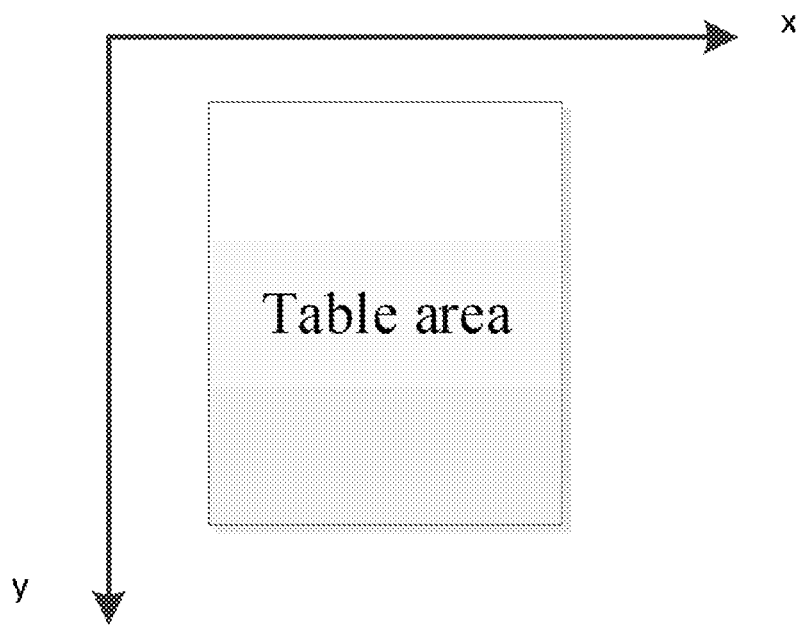
FIG. 3 is a schematic diagram of a position relationship between the table area and a coordinate system according to some embodiments of the present application.

As shown in FIG. 3, taking the coordinates shown in FIG. 3 as reference, if the coordinate of the line on the y direction is greater than or equal to the y coordinate of an upper frame of the table area and is less than or equal to the y coordinate of a lower frame of the table area, and the coordinate of a left endpoint on the x direction is greater than or equal to the x coordinate of a left frame of the table area and is less than the x coordinate of a right frame of the table area, and the coordinate of a right endpoint on the x direction is greater than the x coordinate of the left frame of the table area and is less than or equal to the x coordinate of the right frame of the table area, the line is collected as a horizontal line; and if the coordinate of the line on the x direction is greater than or equal to the x coordinate of the left frame of the table area and is less than or equal to the x coordinate of the right frame of the table area, the coordinate of an upper endpoint on the y direction is greater than or equal to the y coordinate of the upper frame of the table area, and the coordinate of a lower endpoint on the y direction is less than or equal to the y coordinate of the lower frame of the table area, the line is collected as a vertical line.

Figure 5A:
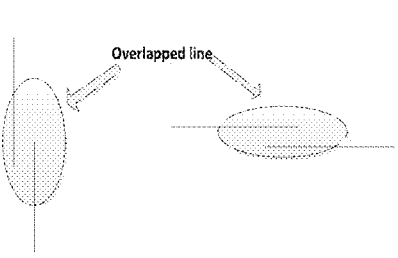
Figure 5B:
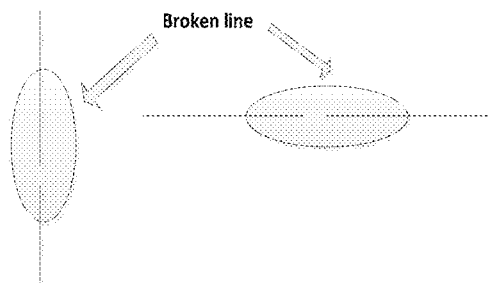

When the line is extracted, two problems may be encountered: (1) as the coordinate mapping may be subjected to the precision problem, which in turn causes an accumulated error to lead to inaccuracy of partial lines, as shown in FIGS. 5a-b; and (2) when the line is extracted according to the PDF vector stream, an excessively low threshold may cause the result that a part of rectangles are recognized as lines, as shown in FIG. 5c. Therefore, as an optional preferred embodiment, after the horizontal lines and the vertical lines are extracted, deduplication and fusion processing may also be performed so that the line used in the subsequent steps is more accurate. In the steps of deduplication and fusion processing, for the horizontal lines: sorting according to the y coordinates from small to large, comparing two adjacent horizontal lines starting from the first horizontal line, if the y coordinates are the same or are less than a set height threshold (for example, 0.5 times as large as the minimum character height in the full text, and may he adjusted according to the actual situation) on the vertical direction, or projections intersect on the horizontal direction or the x coordinates of the maximum left endpoint and the minimum right endpoint of the two horizontal lines are less than a set width threshold (for example, 0.2 times as large as the minimum character width in the full text, and may be adjusted according to the actual situation), using the minimum and maximum x coordinates of four endpoints of the two horizontal lines on the horizontal direction as the left endpoint and the right endpoint, and using the average value of the y coordinates of the two horizontal lines on the vertical direction to constitute a new horizontal line to replace the original two horizontal lines; and comparing the new horizontal line with the subsequent adjacent horizontal lines, and repeating the above operations until all horizontal lines are compared.

For the vertical lines: sorting according to the x coordinates from small to large, comparing two adjacent vertical lines starting from the first vertical line, if the x coordinates are the same or are less than a set width threshold (for example, 0.2 times as large as the minimum character width in the full text, and may he adjusted according to the actual situation) on the horizontal direction, or intersect on the vertical direction or the y coordinates of the maximum upper endpoint and the minimum lower endpoint of the two vertical lines are less than a set height threshold (for example, 0.5 times as large as the minimum character height in the full text, and may be adjusted according to the actual situation), using the minimum and maximum y coordinates of four endpoints of the two vertical lines on the vertical direction as the upper endpoint and the lower endpoint, and using the average value of the y coordinates of the two vertical lines on the vertical direction to constitute a new vertical line to replace the original two vertical lines; and comparing the new vertical line with the subsequent adjacent vertical lines, and repeating the above operations until all vertical lines are compared. More accurate horizontal lines and vertical lines may he obtained after the deduplication and fusion processing.

Figure 4:
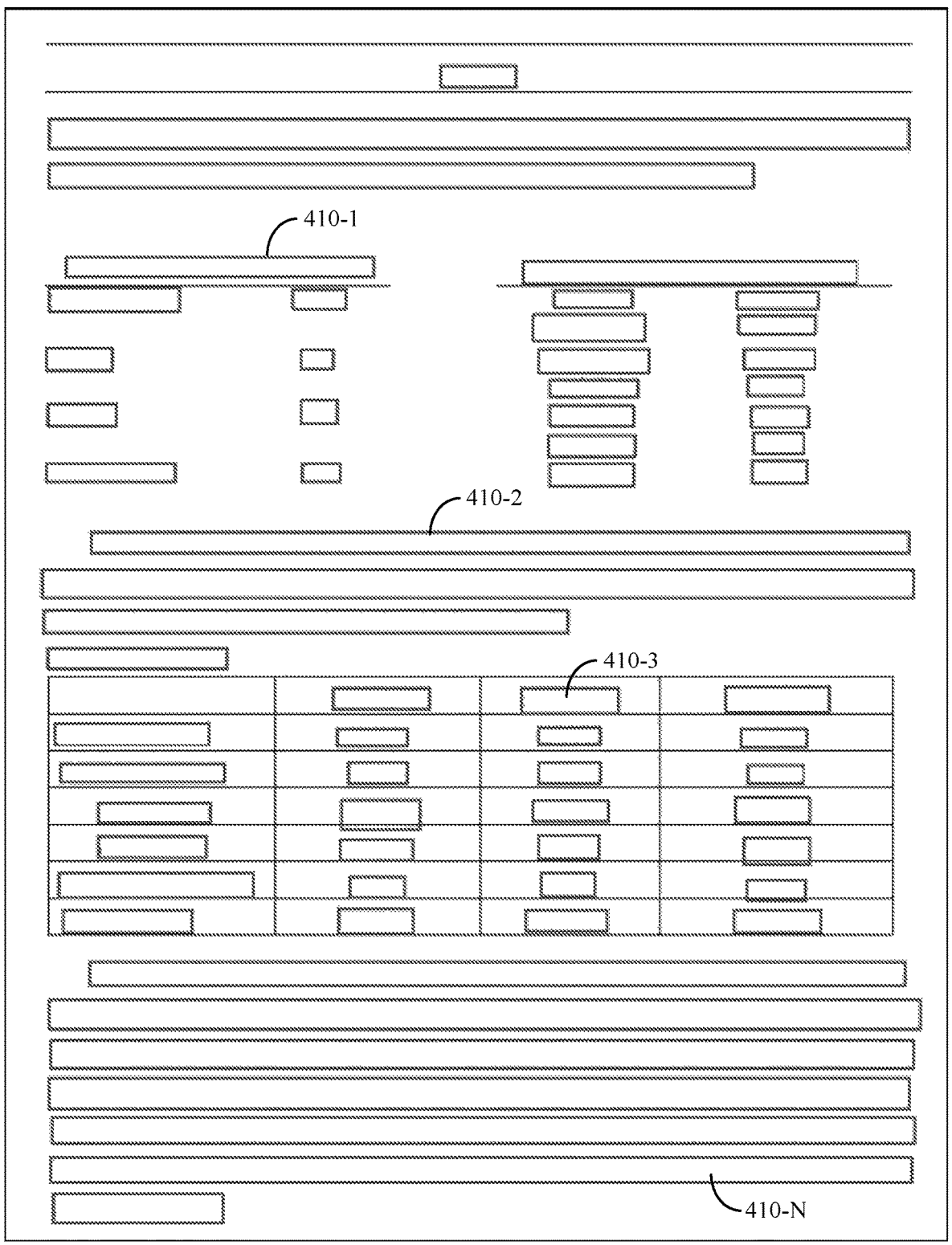
FIG. 4 is a schematic diagram of the PDF document after text blocks are extracted according to some embodiments of the present application.

With respect to the extraction of text blocks, all characters in the PDF page may be extracted at first, and then adjacent characters are clustered into the text blocks according to a character stream sequence and a character pitch, and finally the text blocks contained in the table area are extracted from all text blocks. The character stream sequence is also a vector stream sequence when the PDF describes the page information. Generally, the drawn sequence is from top to bottom and from left to right. However, the PDF does not record character lines or paragraph information when drawing the vector stream information. Actually, the character stream sequence is not enough to accurately determine whether two characters belong to the same line and the same paragraph; and the character pitch refers to the character interval between two characters on the horizontal direction of the page, by combining the character stream sequence and the character pitch at the same time, the adjacent characters may be merged into one text block. As shown in FIG. 4, each gray box area is a text block (e.g., 410-1, 410-2, 410-3, . . . , 410-N) clustered according to the character stream sequence and the character pitch.

S103, determine the types of tables in the table area according to the extracted horizontal lines and vertical lines, wherein the table here is divided into an quasi full-line table and an quasi non-line table, namely, the type includes the quasi full-line table and the quasi non-line table. The quasi full-line table refers to that cells surrounded by at least three table lines exist in the table, the quasi non-line table refers to that cells surrounded by fewer than three table lines exist in the table, and the quasi non-line table includes the situations of completely having no table line and having a part of table lines. During the classification, as an example of an implementable manner, for example, classification is performed by using a classification strategy based on table lines: if the number of the horizontal lines in the table area is zero, or the number of the vertical lines is zero, or there is more than one horizontal line and more than one vertical line, but the horizontal lines and the vertical lines have no intersection point, the table is determined as the quasi non-line table; and the table excluding the quasi non-line table is determined as the quasi full-line table.

When the table is determined as the quasi full-line table, step S104 is executed, and when the table is determined as the quasi non-line table, step S105 is executed.

S104, determine the structure of the quasi full-line table in the table area according to all horizontal lines and all vertical lines in the table area under the assistance of the text blocks in the table area.

Figure 6:
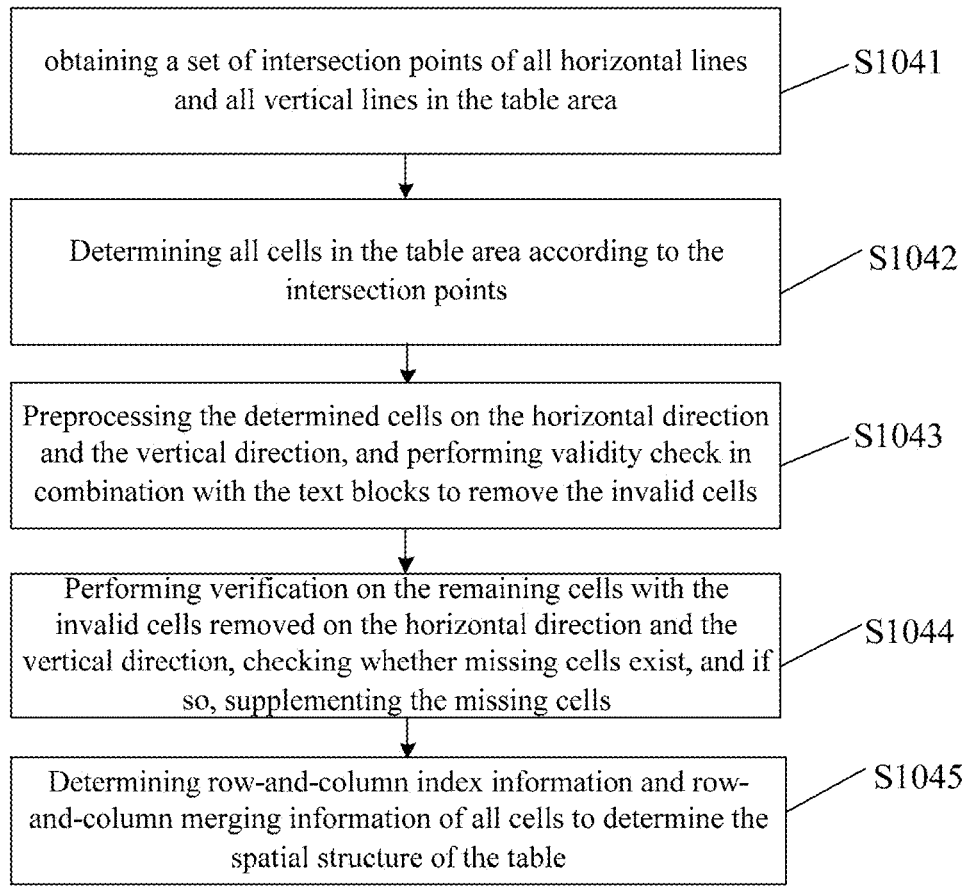
FIG. 6 is a flow diagram of determining the structure of a quasi full-line table according to some embodiments of the present application.

In implementation, as an example of an implementable manner, please refer to FIG. 6, this step may include the following steps:

S1041, figure out a set of intersection points of all horizontal lines and all vertical lines in the table area.

For example, all horizontal lines in the table area are arranged according to the y coordinates from small to large, and all vertical lines in the table area are arranged according to the x coordinates from small to large. Then, starting from the first horizontal line, the intersection points thereof with all vertical lines are figured out in sequence, and if the intersection point exists, the intersection point coordinates are recorded, which includes values of x and y coordinates. Of course, it is also possible to start with the first vertical line, the intersection points thereof with all horizontal lines are figured out in sequence, and if the intersection point exists, the intersection point coordinates are recorded.

S1042, determine all cells in the table area according to the intersection points. With one of the intersection points as the base point, and the other three points are searched. on the up, down, left and right directions, the four points must satisfy the requirements that the connected line segments form four edges of a rectangle, the rectangle is unique, and the rectangle is a cell, and if the four edges of the formed rectangle contain other intersection points, these intersection points cannot form sub-rectangles within the rectangle.

S1043, preprocess the determined cells on the horizontal direction and the vertical direction, and perform validity check in combination with the text blocks to remove the invalid cells.

Figure 7:
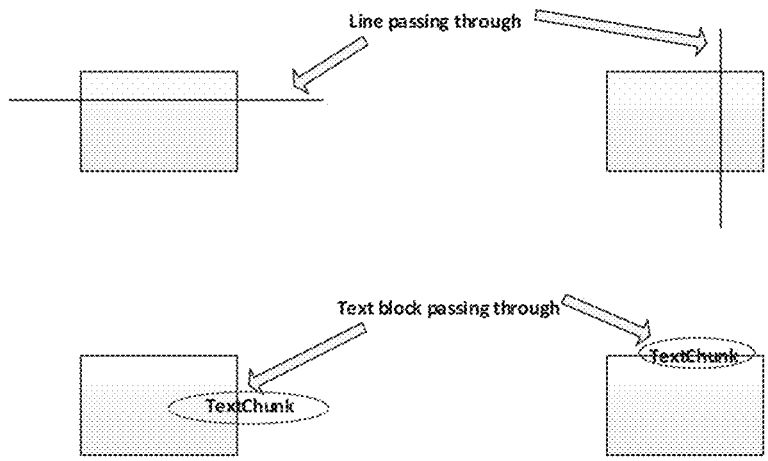
FIG. 7 is a schematic diagram in which lines and text blocks pass through cells according to some embodiments of the present application.

If the extraction accuracy of the lines is not enough, the accumulated error caused may cause the situation as shown in FIG. 7, for example, that is, a text block or a line is inserted into the cell, these invalid cells are removed through this step, and thus the accuracy of table parsing may be improved. In implementation, processing is performed on the horizontal direction and the vertical direction respectively.

Figure 8:
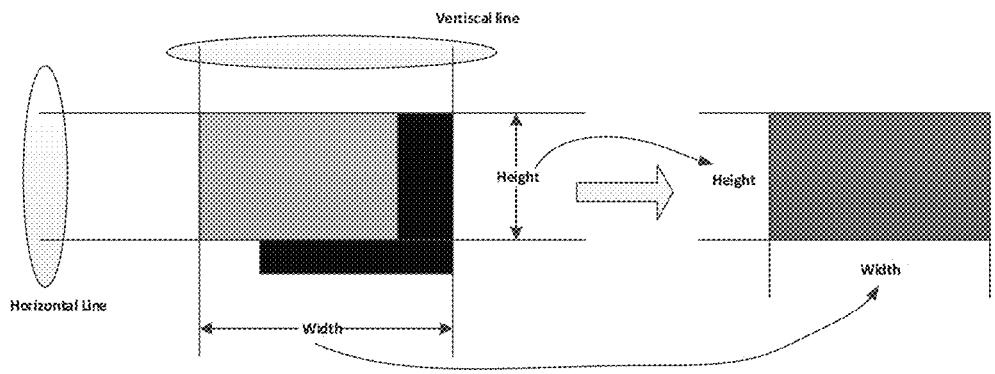
FIG. 8 is a schematic diagram of a cell preprocessing result according to some embodiments of the present application.

On the horizontal direction: grouping all cells according to the y coordinates of the upper frame, and assigning all cells with the same y coordinate to the same row; sorting each row of cells according to the x coordinates of the left frame from small to large, detecting the cells in sequence, and detecting and deleting the cells through which the lines and/or the text blocks pass; for the remaining cells, starting from the first cell of each row, sequentially comparing the first cell with the adjacent cells in the row, if the two cells have an intersection and the overlapping area exceeds a set overlapping threshold (for example, 80%), detecting whether the left and right frames of the two cells have vertical lines, if so, retaining the vertical lines with the highest goodness of fit with the vertical lines to serve as the left and right frames, keeping the upper and lower frames unchanged to form a new cell, and replacing the original two cells with the new cell, as shown in FIG. 8; and comparing the new cell with the subsequent adjacent cells in sequence, and repeating the above operations until all cells in the row are compared.

On the vertical direction: grouping all cells according to the x coordinates of the left frame, and assigning all cells with the same x coordinate to the same column; sorting each column of cells according to the y coordinates of the upper frame from small to large, detecting the cells in sequence, and detecting and deleting the cells through which the lines and/or the text blocks pass; for the remaining cells, starting from the first cell of each column, sequentially comparing the first cell with the adjacent cells in the column, if the two cells have an intersection and the overlapping area exceeds a set overlapping threshold (for example, 80%), detecting whether the upper and lower frames of the two cells have horizontal lines, if so, retaining the horizontal lines with the highest goodness of fit with the horizontal lines to serve as the upper and lower frames, keeping the left and right frames unchanged to form a new cell, and replacing the original two cells with the new cell, as shown in FIG. 8; and comparing the new cell with the subsequent adjacent cells in sequence, and repeating the above operations until all cells in the column are compared.

In the above steps, as an example, the way of detecting and deleting the cells through which the lines and/or the text blocks pass may be: if the y coordinate of a certain horizontal line is greater than the y coordinate of the upper frame of the cell and is less than the y coordinate of the lower frame, and meanwhile the horizontal line intersects with the left and right frames of the cell, deleting the cell; or, if the x coordinate of a certain vertical line is greater than the x coordinate of the left frame of the cell and is less than the x coordinate of the right frame, and meanwhile the vertical line intersects with the upper and lower frames of the cell, deleting the cell; or, if a certain text block intersects with any of the four frames of the cell, deleting the cell.

It should be noted that the horizontal direction and the vertical direction are not processed at the same time, and processed one after another. Firstly, horizontal direction (or the vertical direction) processing is performed, and then vertical direction (or the horizontal direction) processing is performed based on the processing result. As shown in FIG. 8, the final result after the processing is the cell as shown on the right side in FIG. 8.

S1044, perform verification on the cells remaining after the invalid cells are removed on the horizontal direction and the vertical direction, check whether missing cells exist, and if so, supplement the missing cells.

Figure 9:
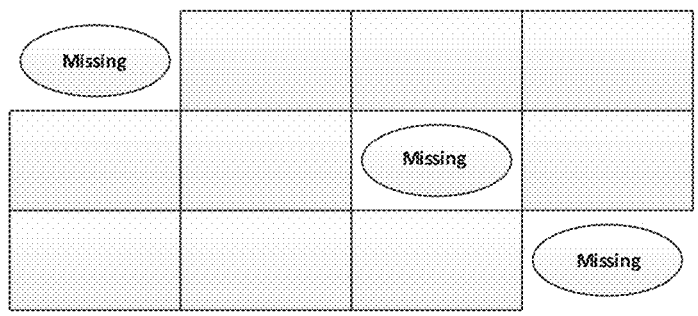
FIG. 9 is a schematic diagram of missing cells according to some embodiments of the present application.

In the above step S1044, the invalid cells are removed, and correct cells may also be deleted mistakenly, as shown in FIG. 9. This step is to supplement the error deletion operation and supplement the missing cells so as to guarantee the extraction accuracy of the cells.

The cells are mainly supplemented on the horizontal direction and the vertical direction, and are searched on four directions of up, down, left and right by a region growing search method.

The search process on the horizontal direction includes the following steps:

a. sort each row of cells according to the x coordinate of the left frame from small to large, determine whether the first cell is overlapped with the left frame of the table area, if not, search leftward to find the nearest line satisfying cell features, determine the cell, and with this cell as reference, continue to compare the cell with the left frame of the table area, and so on, until all cells on the left side are found, that is, the line satisfying the cell features cannot be found on the left side. The line satisfying the cell features here means that the left frame line of the cell intersects with the left endpoints of the upper and lower frame lines, and the x coordinates of the left endpoints of the upper and lower frame lines are less than or equal to the x coordinate of the left frame line or are within a very small threshold range, such as 2.

b. if the first cell is overlapped with the left frame of the table area, assume that the current cell is cell1, and the adjacent cell in this row is cell2, if the difference between the x coordinate of the right frame of the cell1 and the x coordinate of the left frame of the cell2 exceeds a certain threshold (such as the minimum character width of the current page, which may be adjusted according to actual conditions), determine that it is necessary to supplement a cell between the two cells, and the left and right frames of the supplemented cell are respectively overlapped with the right frame of the cell1 and the left frame of the cell; if the difference between the x coordinate of the right frame of the cell1 and the x coordinate of the left frame of the cell2 does not exceed a certain threshold, determine that it is not necessary to supplement the cell between the two cells, and then, with the cell2 as reference, sequentially compare adjacent cells rightward until all cells in the row are compared and supplemented.

c. determine whether the last cell of each row is overlapped with the right frame line of the table area, if not, search rightward to find the nearest line satisfying the cell features, determine the cell, and with the cell as reference, continue to compare the cell with the right frame of the table area, and so on, until all cells on the right side are found. The line satisfying the cell features here means that the right frame line of the cell intersects with the right endpoints of the upper and lower frame lines, and the x coordinates of the right endpoints of the upper and lower frame lines are greater than or equal to the x coordinate of the right frame line or are within a very small threshold range, such as The search process on the vertical direction includes the following steps:

a. sort each column of cells according to the y coordinate of the upper frame from small to large, determine whether the first cell is overlapped with the upper frame of the table area, if not, search upward to find the nearest line satisfying the cell features, determine the cell, and with this cell as reference, continue to compare the cell with the upper frame of the table area, and so on, until all cells on the upper side are found. The line satisfying the cell features here means that the upper frame line of the cell intersects with the left and right frame lines at the same time, and the y coordinates of the upper endpoints of the left and right frame lines are less than or equal to the y coordinate of the upper frame line or are within a very small threshold range, such as 2.

b. if the first cell is overlapped with the upper frame of the table area, assume that the current cell is cell1, and the adjacent cell is cell2, if the difference between the y coordinate of the lower frame of the cell1 and they coordinate of the upper frame of the cell2 exceeds a certain threshold (such as 3.5, which may be adjusted according to actual conditions), determine that it is necessary to supplement a cell between the two cells, and the upper and lower frames of the supplemented cell are respectively overlapped with the lower frame of the cell1 and the upper frame of the cell2;

if the difference between the x coordinate of the lower frame of the cell1 and the y coordinate of the upper frame of the cell2 does not exceed a certain threshold, determine that it is not necessary to supplement the cell between the two cells, and then, with the cell2 as reference, sequentially compare adjacent cells downward until all cells in the column are compared and supplemented.

c. determine whether the last cell of each column is overlapped with the lower frame line of the table area, if not, search downward to find the nearest line satisfying the cell features, determine the cell, and with the cell as reference, continue to compare the cell with the lower frame of the table area, and so on, until all cells on the lower side are found. The line satisfying the cell features here means that the lower frame line of the cell intersects with the lower endpoints of the left and right frame lines, and the y coordinates of the lower endpoints of the left and right frame lines are greater than or equal to the y coordinate of the lower frame line or are within a very small threshold range, such as 2.

S1045, determine row-and-column index information and row-and-column merging information of all cells. Through the foregoing steps S1041-S1044, the cells constituting the table in the quasi full-line table area have been accurately determined. In this step, the row-and-column index information and the row-and-column merging information of the table may be determined.

For example, firstly, the y coordinates of the upper frames of the cells are sorted from small to large, and the cells with y coordinates within a certain threshold range are set as in the same row, in this way, the row indexes of all cells are determined from top to bottom, and the row indexes of the cells may be 0–(N−1) if there are N rows;

then, each row of cells is sorted according to the x coordinates of the left frames of the cells from small to large, the column index of each cell is sequentially determined, and if the row has M cells, the column indexes of the cells may be 0–(M−1);

then, vertical direction projection is performed on each cell, if n rows are covered, the row merging information is n, horizontal direction projection is performed on the cell, and if m columns are covered, the column merging information is m; and finally, a spatial structure of the table can be determined via the row-and-column indexes and the row-and-column merging information of the cells to obtain final structured data.

S105, determine the structure of the quasi non-line table in the table area according to all text blocks in the table area under the assistance of the horizontal lines and/or the vertical lines in the table area.

Figure 10:
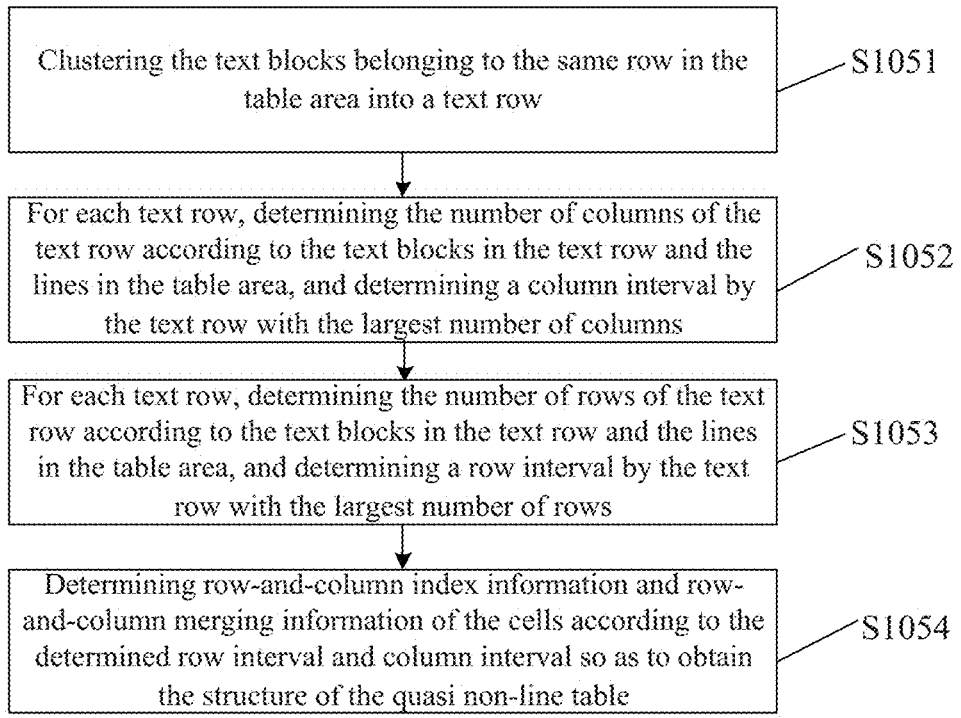
FIG. 10 is a flow diagram of determining the structure of a quasi non-line table according to some embodiments of the present application.

In implementation, as an example of an implementable manner, please refer to FIG. 10, this step may include the following steps:

S1051, cluster the text blocks belonging to the same row in the table area into text rows.

During the clustering, it should be noted that the merged text blocks belong to the same text row. As shown in FIG. 9a, if the distances among three text blocks on the vertical direction are less than a certain threshold (for example, the average height of text block characters), and there is a projection overlap area on the horizontal direction, it is considered as a merged text block. During the clustering, all independent text blocks and merged text blocks are projected on the vertical direction, wherein the merged text blocks are projected as a whole, and the text blocks having intersection are clustered into a text row.

S1052, for each text row, determine the number of individual text blocks in the text row and the number of columns of the merged text block according to the text blocks in the text row and the horizontal lines and/or the vertical lines in the table area, take the sum of the two as the number of columns of the text row, and retain the text row with the largest number of columns; if there are a plurality of text rows with the largest number of columns, sort the text rows according to the y coordinates from small to large, perform horizontal projection clustering on the text blocks in the adjacent text rows in sequence, use the minimum value on the horizontal direction as the left frame of the column interval, use the maximum value as the right frame of the column interval, respectively use the upper and lower frames of the table area as the upper and lower frames of the column interval, and determine the clustered column interval; and if there is only one text row with the largest number of columns, directly determine the column interval via the coordinates of the text blocks in the text row.

In general, the merged text block typically includes multiple rows of text blocks visually, as shown in several cases in FIGS. 11a-f.

Figures 11A, 11B:
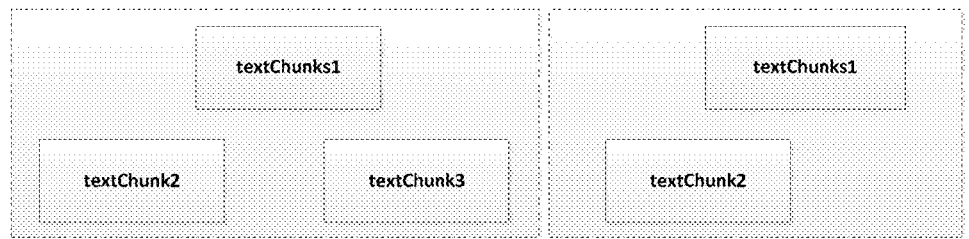
FIGS. 11a-f are respectively schematic diagrams of merged text blocks according to some embodiments of the present application.
Figures 11C, 11D:
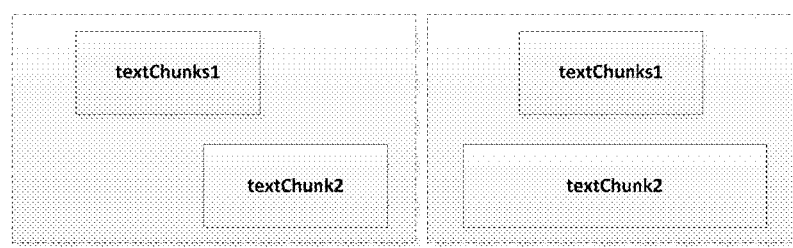
Figure 11E:
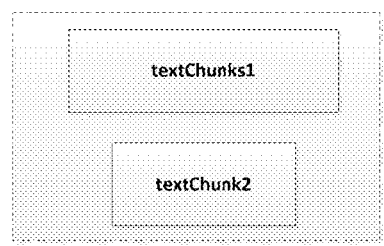

Corresponding to the merged text block in FIG. 11a, the projections of the text block 1 with the text block 2 and the text block 3 on the horizontal direction have overlap areas, the projections of the text block 2 and the text block 3 on the horizontal direction have no overlap area, and the distance of the two is greater than a set distance threshold, then the number of columns of the merged text block is 2, and so on, if the text block 1 covers N' text blocks, the N' text blocks have no projection overlap area on the horizontal direction and mutually satisfy a certain distance, then the number of columns of the merged text block is N.

Corresponding to the merged text block in FIGS. 11b-e, the projections of the text block 1 and the text block 2 on the horizontal direction have an overlap area, then the number of columns of the merged text block is 1, and so on, if the text block 1 covers the N' text blocks, the N' text blocks have projection overlap areas on the horizontal direction and have the projection overlap area between any two text blocks, then the number of columns of the merged text block is 1.

Figure 11F:
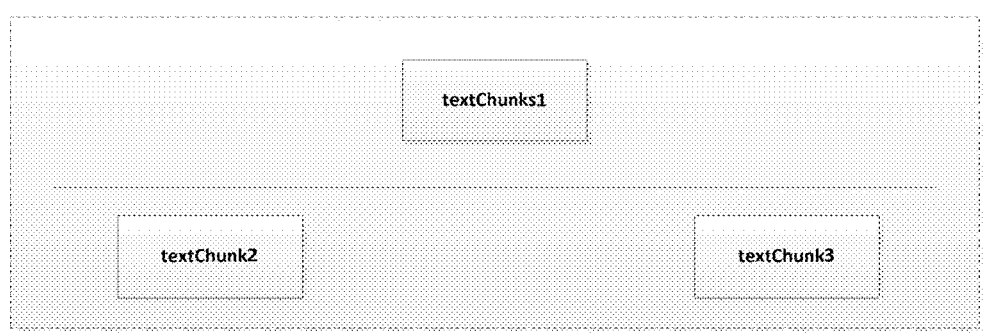

Corresponding to the merged text block in FIG. 11f, the text block 1, the text block 2 and the text block 3 are entirely divided by horizontal lines, the projections of the text block 2 and the text block 3 on the horizontal direction have no overlap area, and a certain distance is satisfied, then the number of columns of the merged text block is 2, and so on, if the text block 1 is separated from the N' text blocks by lines, the N' text blocks have no projection overlap area on the horizontal direction and mutually satisfy a certain distance, then the number of columns of the merged text block is N'.

For one text row, it is determined that the number of columns of the merged text block is N1, and the number of non-merged text blocks is N2, then it may be determined that the number of columns of the text row is (N1+N2).

Figure 12:
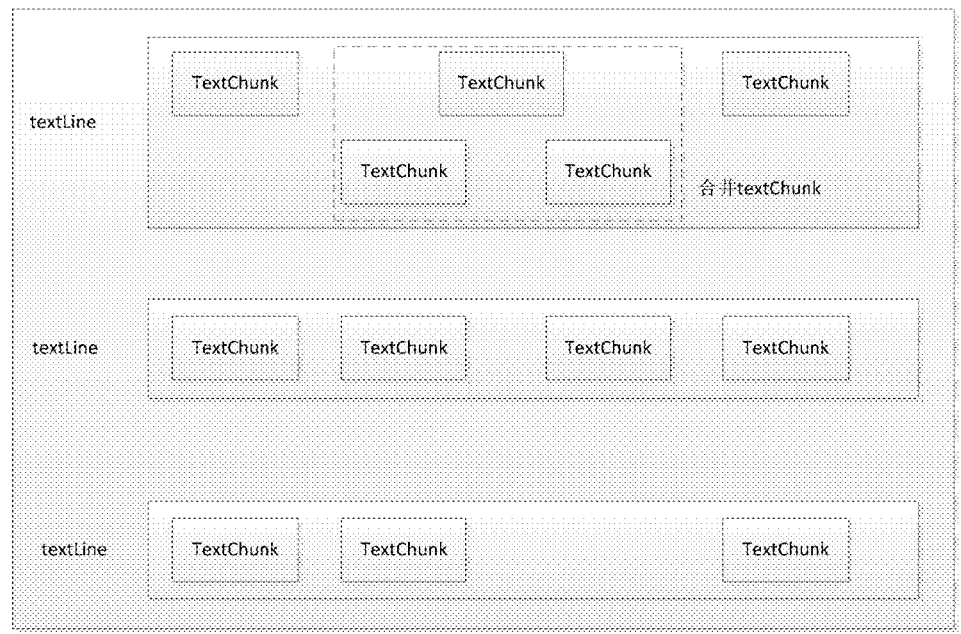
FIG. 12 is a schematic diagram of clustering text blocks into text rows according to some embodiments of the present application.

After the numbers of columns for all text rows are determined, there are a plurality of text rows with the largest number of columns, as shown in FIG. 12, the largest number of columns is 4, and the number of columns of two text rows is 4, which are respectively the first one and the second one, then the two text rows need to be retained and are further processed later.

S1053, for each text row, perform vertical projection on the text blocks in the text row, use the number of projection areas as the number of rows of the text row, and retain the text row with the largest number of rows; if there are a plurality of text rows with the largest number of rows, sort the text rows according to the x coordinates from small to large, sequentially perform vertical projection clustering on the text blocks in adjacent text rows, use the minimum value on the vertical direction as the upper frame of a row interval, use the maximum value as the lower frame of the row interval, respectively use the left and right frames of the table area as the left and right frames of the row interval, and determine the clustered row interval; and if there is only one text row with the largest number of rows, directly perform projection on the text row to determine the column interval.

Figure 13:
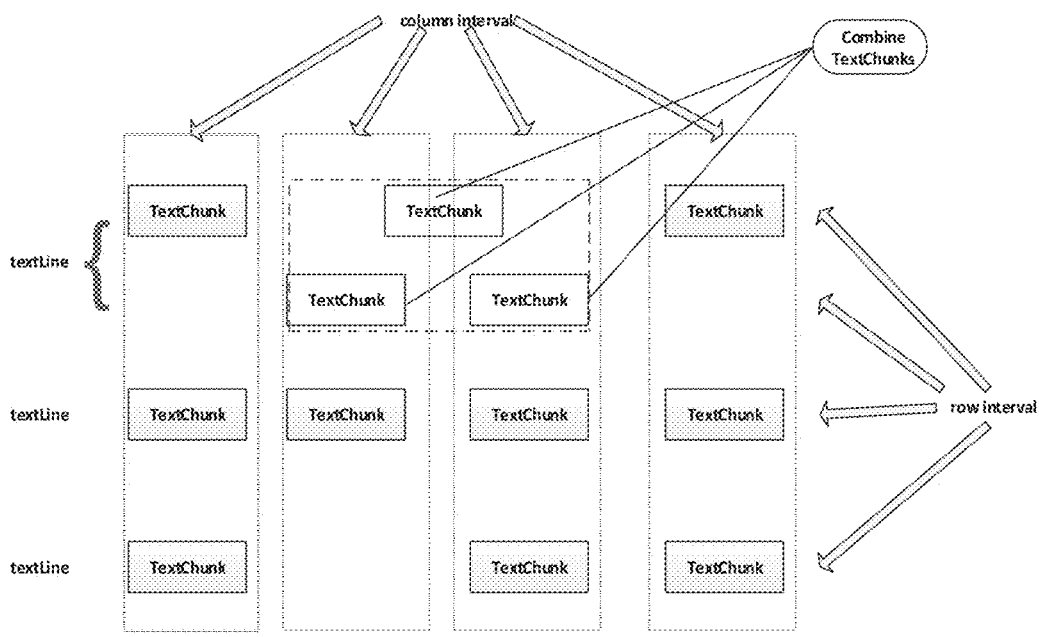
FIG. 13 is a schematic diagram after a row interval and a column interval are determined according to some embodiments of the present application.

As shown in FIG. 12, the first text row contains 3 text blocks, in which the middle text block is a merged text block, and the text blocks on the two sides are independent text blocks and are projected on the vertical direction, and there are two areas in total, namely, the two row intervals as shown in FIG. 13.

S1054, determine row-and-column index information and row-and-column merging information of the cells according to the determined row interval and column interval so as to obtain the structure of the quasi non-line table. For example, each text row is parsed, all text blocks in the current text row are extracted, vertical projection is performed on the extracted blocks with the row interval of the current text row in sequence to determine the row index information and the row merging information, and horizontal projection is performed on the extracted blocks with the column interval of the current text row to determine the column index information and the column merging information.

For example, the first text row is extracted at first, the row intervals corresponding to the text row are sorted according to the y coordinates from small to large, and the index value of the column interval in the text row is determined, for example, there are N column intervals, and the index values correspond to 0–(N–1), all text blocks in the text row are extracted, a row offset rowOffset is set, starting from 0, after each text row is processed, the value of the row offset rowOffset will increase the number of the row intervals of the current text row.

Then, for each text block, whether a line cell contains the text block is checked at first, if so, the cell is used to perform projection on the vertical direction, otherwise the text block itself is used to perform the projection on the vertical direction, and finally the corresponding overlapped row interval projection is obtained, and if the vertical projection of the text block intersects with N row intervals on the vertical projection direction, the row merging information of the text block is N, otherwise it is 1.

If the currently processed text block only has a vertical projection intersection with one row interval, the row index of the text block is rowOffset, and if the text block has vertical projection intersection with multiple row intervals, the row index of the text block is rowOffset plus the sum of the indexes of the first row interval in the corresponding multiple row intervals.

Then, for each text block, whether a line cell contains the text block is checked at first, if so, the cell is used to perform horizontal projection, otherwise the text block itself is used to perform the horizontal projection, the column interval with a horizontal projection intersection is found, if there is only one column interval, the column index of the text block is the index of the corresponding column interval, and the column merging information is 1, and if there are multiple column intervals, the index of the first column interval in the multiple column intervals is the column index of the text block, and the column merging information is the number of the corresponding column intervals.

And so on, the next text row is processed until the parsing of all text rows is completed, and finally the spatial structure of the table is obtained.

Based on the same inventive concept, an embodiment of the present application further provides a table vector parsing device in a PDF document. For details that are not described in this embodiment, reference is made to the corresponding contents in the foregoing embodiment of the method.

Figure 14:
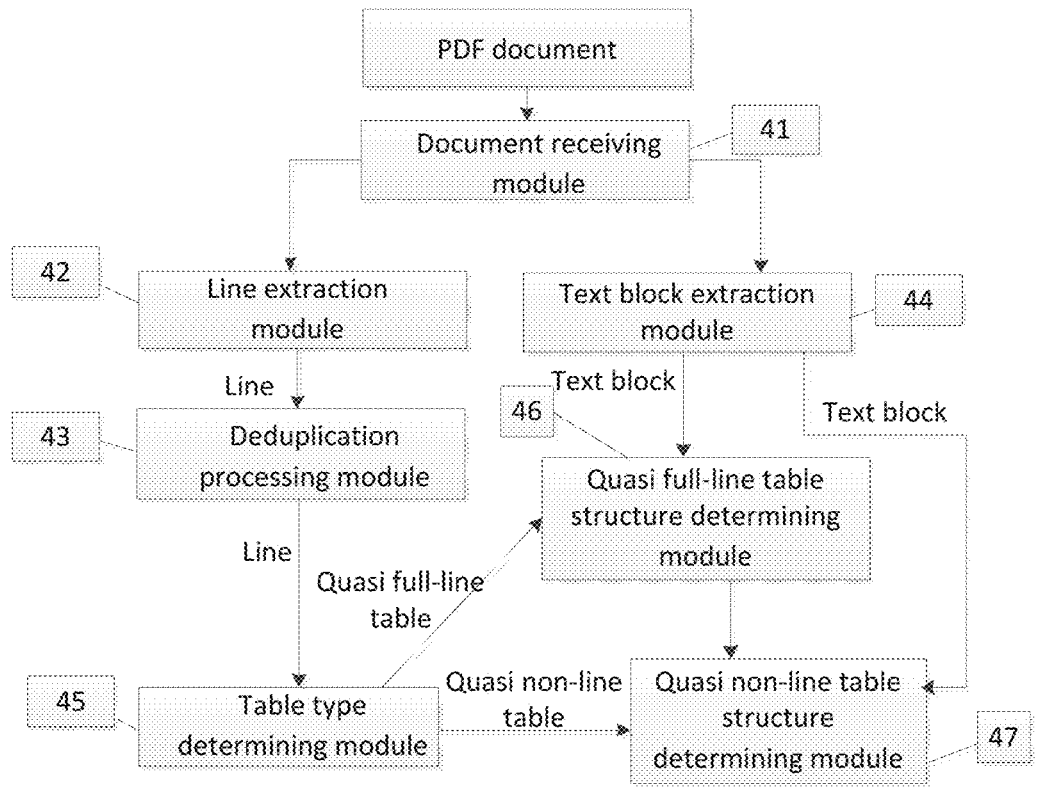
FIG. 14 is a diagram of functional modules of a device for parsing tables in a PDF document according to some embodiments of the present application.

Referring to FIG. 14, the table vector parsing device in the PDF document includes:

a document receiving module 41, configured to receive the PDF document with a determined table area;

a line extraction module 42, configured to extract horizontal lines and vertical lines in the table area;

a deduplication processing module 43, configured to perform deduplication and fusion processing on the extracted horizontal lines and vertical lines;

a text block extraction module 44, configured to extract text blocks in the table area;

a table type determining module 45, configured to determine the types of tables in the table area according to the extracted horizontal lines and vertical lines, wherein the type includes an quasi full-line table and an quasi non-line table;

an quasi full-line table structure determining module 46 configured to, if the table is the quasi full-line table, determine the structure of the quasi full-line table in the table area according to all horizontal lines and all vertical lines in the table area under the assistance of the text blocks in the table area; and an quasi non-line table structure determining module 47 configured to, if the table is the quasi non-line table, determine the structure of the quasi non-line table in the table area according to all text blocks in the table area under the assistance of the horizontal lines and/or the vertical lines in the table area.

In one embodiment, the quasi full-line table structure determining module 46 includes the following sub-modules:

an intersection point determining sub-module, configured to figure out a set of intersection points of all horizontal lines and all vertical lines in the table area;

a primary cell determining sub-module, configured to determine all cells in the table area according to the intersection points; and an quasi full-line table structure determining sub-module, configured to determine row-and-column index information and row-and-column merging information of all cells to obtain the structure of the quasi full-line table.

In addition, in other embodiments, optionally, the quasi full-line table structure determining module 46 may further include:

an invalid cell removal sub-module, configured to preprocess the determined cells on the horizontal direction and the vertical direction, and perform validity check in combination with the text blocks to remove the invalid cells; and a missing cell supplementing sub-module, configured to perform verification on the cells remaining after the invalid cells are removed on the horizontal direction and the vertical direction, check whether missing cells exist, and if so, supplement the missing cells.

In one embodiment, the quasi non-line table structure determining module 47 includes:

a text block clustering sub-module, configured to cluster the text blocks belonging to the same row in the table area into text rows;

a column interval determining sub-module configured to, for each text row, determine a column interval contained in the text row. For example, the number of individual text blocks in the text row and the number of columns of the merged text block are determined according to the text blocks in the text row and the horizontal lines and/or the vertical lines in the table area, the sum of the two is taken as the number of columns of the text row, and the text row with the largest number of columns is retained; if there are a plurality of text rows with the largest number of columns, the text rows are sorted according to the y coordinates from small to large, horizontal projection clustering is performed on the text blocks in the adjacent text rows in sequence, the minimum value on the horizontal direction is used as the left frame of the column interval, the maximum value is used as the right frame of the column interval, the upper and lower frames of the table area are respectively used as the upper and lower frames of the column interval, and the clustered column interval is determined; and if there is only one text row with the largest number of columns, the column interval is directly determined via the coordinates of the text blocks in the text row;

a row interval determining sub-module configured to, for each text row, determine a row interval contained in the text row. For example, vertical projection is performed on the text blocks in the text row, the number of projection areas is used as the number of rows of the text row, and the text row with the largest number of rows is retained; if there are a plurality of text rows with the largest number of rows, the text rows are sorted according to the x coordinates from small to large, vertical projection clustering is sequentially performed on the text blocks in adjacent text rows, the minimum value on the vertical direction is used as the upper frame of the row interval, the maximum value is used as the lower frame of the row interval, the left and right frames of the table area are respectively used as the left and right frames of the row interval, and the clustered row interval is determined; and if there is only one text row with the largest number of rows, vertical projection is directly performed on the text row to determine the row interval; and an quasi non-line table structure determining sub-module, configured to determine row-and-column index information and row-and-column merging information of the cells according to the determined row interval and column interval so as to obtain the structure of the quasi non-line table.

In one embodiment, the table type determining module 45 is specifically configured to:

if the number of the horizontal lines in the table area is zero, or the number of the vertical lines is zero, or there is more than one horizontal line and more than one vertical line, but the horizontal lines and the vertical lines have no intersection point, determine the table as the quasi non-line table; and determine the table excluding the quasi non-line table as the quasi full-line table.

In one embodiment, the line extraction module 42 is specifically configured to:

extract all path drawing information in a PDF page and merge the same into a line;

if the coordinate of the line on the y direction is greater than or equal to the y coordinate of an upper frame of the table area and is less than or equal to the y coordinate of a lower frame of the table area, and the coordinate of a left endpoint on the x direction is greater than or equal to the x coordinate of a left frame of the table area and is less than the x coordinate of a right frame of the table area, and the coordinate of a right endpoint on the x direction is greater than the x coordinate of the left frame of the table area and is less than or equal to the x coordinate of the right frame of the table area, collect the line as a horizontal line; and if the coordinate of the line on the x direction is greater than or equal to the x coordinate of the left frame of the table area and is less than or equal to the x coordinate of the right frame of the table area, the coordinate of an upper endpoint on the y direction is greater than or equal to the y coordinate of the upper frame of the table area, and the coordinate of a lower endpoint on they direction is less than or equal to they coordinate of the lower frame of the table area, collect the line as a vertical line.

Figure 15:
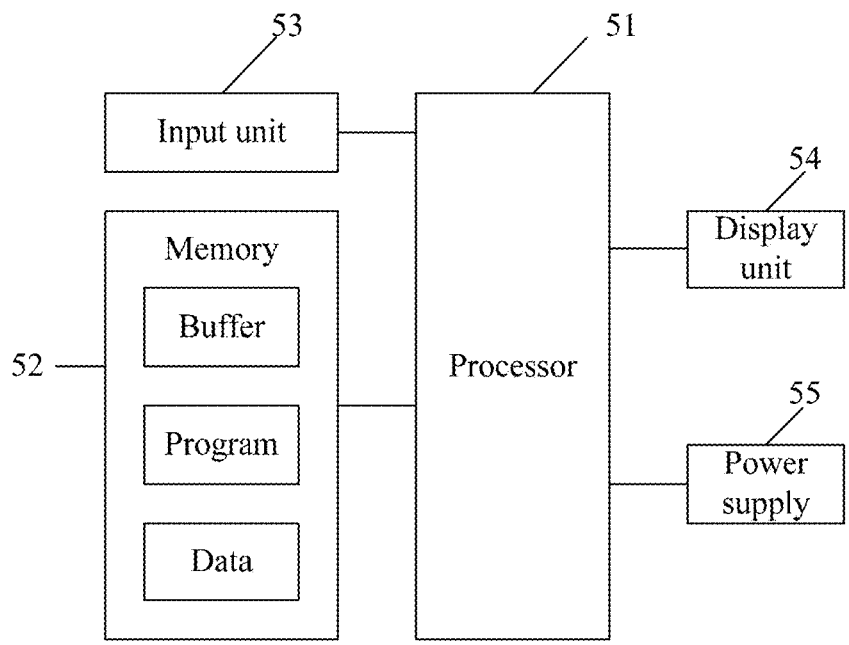
FIG. 15 is a composition block diagram of electronic equipment according to some embodiments of the present application.

As shown in FIG. 15, this embodiment simultaneously provides electronic equipment. The electronic equipment may include a processor 51 and a memory 52, wherein the memory 52 is coupled to the processor 51. It should be noted that the figure is exemplary, and the structure may also be supplemented or replaced with other structure to realize data extraction, chart redrawing, communication or other functions.

As shown in FIG. 15, the electronic equipment may further include an input unit 53, a display unit 54 and a power supply 55. It should be noted that the electronic equipment does not necessarily include all components shown in FIG. 15. Moreover, the electronic equipment may further include components not shown in FIG. 15, referring to the prior art.

The processor 51 is also referred to as a controller or an operation control sometimes, and may include a microprocessor or other processor devices and/or logic devices. The processor 51 receives an input and controls the operation of each component of the electronic equipment.

The memory 52, for example, may be one or more of a cache, a flash memory, a hard driver, a mobile medium, a volatile memory, a non-volatile memory and other proper devices, and may store configuration information of the processor 51, instructions executed by the processor 51, recorded table data and other information. The processor 51 may execute a program stored in the memory 52 to implement information storage or processing or the like. In one embodiment, the memory 52 further includes a buffer memory, i.e., a buffer, to store intermediate information.

The input unit 53, for example, is configured to provide a to-be-processed PDF document for the processor 51. The display unit 54 is configured to display various state diagrams as shown in FIGS. 6-8 and FIGS. 10-12, or information extracted from the table in the PDF document, or a reconstructed table. The display unit, for example, may be a liquid crystal display (LCD), but the present application is not limited thereto. The power supply 55 is configured to supply power to the electronic equipment.

An embodiment of the present application further provides a computer readable instruction, wherein when the instruction is executed in the electronic equipment, the program enables the electronic equipment to execute the operation steps included in the method of the present application.

An embodiment of the present application further provides a non-transitory computer readable storage medium storing a computer readable instruction, wherein the computer readable instruction enables the electronic equipment to execute the operation steps included in the method of the present application.

It should be understood that, in various embodiments of the present application, the serial numbers of the above-mentioned steps do not mean the execution sequence. The execution sequence of the steps should be determined based on the functions and inherent logics thereof, but should not constitute any limitation to the implementation process of the embodiment of the present application.

Those of ordinary skill in the art may realize that the units and algorithm steps of each example described in combination with the embodiments disclosed in the present disclosure may be implemented by electronic hardware, computer software or the combination of computer software and the electronic hardware. In order to clearly describe the interchangeability of hardware and software, the composition and steps of each example are described generally above according to the functions. Whether these functions are executed by hardware or software depends on a specific application and design constraint conditions of the technical solution. Professionals may use different methods to implement the described functions for each specific application, but such implementation should not be considered as going beyond the scope of the present application.

Those skilled in the art may clearly understand that, for the purpose of convenience and briefness in description, for the specific working processes of the above-described systems, devices and units, reference could be made to the corresponding processes in the embodiments of the aforementioned methods, and description is not repeated here.

In the several embodiments provided in the present application, it should be understood that the disclosed systems, devices and methods may be realized in other modes. For example, the embodiments of the above-described devices are only exemplary, for example, the division of the units is only a logic function division, other division modes may be adopted in practice, a plurality of units or components may be combined or integrated in another system, or some characteristics may be omitted or not executed. In addition, the displayed or discussed mutual coupling or direct coupling or communication connection may be indirect coupling or communication connection of devices or units through some interfaces, and may also be in electrical, mechanical or other forms.

The units illustrated as separate components may be or may not be physically separated, and the components displayed as units may be or may not be physical units, that is to say, the components may be positioned at one place or may also be distributed on a plurality of network units. The objectives of the solutions of the embodiments of the present application may be fulfilled by selecting part of or all of the units according to actual needs.

When the integrated unit is realized in the form of a software functional unit and sold or used as an independent product, the integrated unit may be stored in a non-transitory computer readable storage medium. Based on such an understanding, the technical solution of the present application substantially, or all or part of the present application making contribution to the prior art, or a part or all of the technical solution may be embodied in the form of a software product, and the computer software product is stored in a storage medium, which includes a plurality of instructions enabling computer equipment (which may be a personal computer, a server, or network equipment or the like) to execute all of or part of the steps in the methods of the embodiments of the present application. The aforementioned storage medium includes: various media capable of storing program codes, such as a U disk, a mobile hard disk, a read-only memory (ROM, Read-Only Memory), a random access memory (RAM, Random Access Memory), a magnetic disk or an optical disk.

The above description is the specific embodiments of the present application only, but the scope of the present application is not limited thereto, any skilled who is familiar with this art could readily think of variations or substitutions within the disclosed technical scope of the present application, and these variations or substitutions shall fall within the scope of the present application. Thus, the scope of the present application shall be subjected to the scope of the claims.

The invention claimed is:

1. A method for parsing tables in a PDF document performed at an electronic device, comprising the following steps:
   receiving, by the electronic device, the PDF document containing one or more table areas;
   extracting, by the electronic device, horizontal lines, vertical lines and text blocks in the table areas;
   determining, by the electronic device, the types of tables in the table areas according to the extracted horizontal lines and vertical lines, wherein the type of the table comprises a quasi full-line table and a quasi non-line table;
   in accordance with a determination that a table is the quasi full-line table, determining, by the electronic device, the structure of the quasi full-line table in the table area according to the horizontal lines and the vertical lines in the table area with assistance of the text blocks in the table area; and
   in accordance with a determination that a table is the quasi non-line table, determining, by the electronic device, the structure of the quasi non-line table in the table area according to the text blocks in the table area with assistance of the horizontal lines and/or the vertical lines in the table area,
   wherein the step of extracting the horizontal lines and the vertical lines in the table area comprises:
   extracting all path drawing information in a PDF page and merging the same into lines;
   if the coordinate of a line on the y direction is greater than or equal to the y coordinate of the upper frame of the table area and is less than or equal to the y coordinate of the lower frame of the table area, and the coordinate of a left endpoint on the x direction is greater than or equal to the x coordinate of the left frame of the table area and is less than the x coordinate of the right frame of the table area, and the coordinate of a right endpoint on the x direction is greater than the x coordinate of the left frame of the table area and is less than or equal to the x coordinate of the right frame of the table area, collecting the line as a horizontal line; and
   if the coordinate of a line on the x direction is greater than or equal to the x coordinate of the left frame of the table area and is less than or equal to the x coordinate of the right frame of the table area, the coordinate of an upper endpoint on the y direction is greater than or equal to the y coordinate of the upper frame of the table area, and the coordinate of a lower endpoint on the y direction is less than or equal to the y coordinate of the lower frame of the table area, collecting the line as a vertical line.

2. The method according to claim 1, wherein, before the step of determining the types of the tables in the table areas, the method further comprises: performing, by the electronic device, deduplication and fusion processing on the extracted horizontal lines and vertical lines.

3. The method according to claim 2, wherein the step of performing deduplication and fusion processing on the extracted horizontal lines and vertical lines comprises:
   for the horizontal lines: sorting, by the electronic device, the horizontal lines according to the y coordinates in an order from small to large; starting from the first horizontal line, comparing, by the electronic device, every two adjacent horizontal lines in sequence; if the y coordinates are the same or less than a set height threshold on the vertical direction, or the projections of the two adjacent horizontal lines intersect on the horizontal direction or the x coordinates of the maximum left endpoint and the minimum right endpoint of the two horizontal lines are less than a set width threshold, taking the minimum and maximum x coordinates of four endpoints of the two horizontal lines on the horizontal direction as the x coordinates of the new left endpoint and the new right endpoint respectively, and taking the average value of the y coordinates of the two horizontal lines on the vertical direction as the new y coordinate to constitute a new horizontal line to replace the original two horizontal lines;

comparing, by the electronic device, the new horizontal line with the adjacent horizontal lines, and repeating the above operations until all horizontal lines are compared;

for the vertical lines: sorting the vertical lines according to the x coordinates in an order from small to large; starting from the first vertical line, comparing every two adjacent vertical lines in sequence; if the x coordinates are the same or less than a set width threshold on the horizontal direction, or the projections of the two adjacent vertical lines intersect on the vertical direction or the y coordinates of the maximum upper endpoint and the minimum lower endpoint of the two vertical lines are less than a set height threshold, taking the minimum and maximum y coordinates of four endpoints of the two vertical lines on the vertical direction as the y coordinates of the new upper endpoint and the new lower endpoint, and taking the average value of the y coordinates of the two vertical lines on the vertical direction as the new y coordinate to constitute a new vertical line to replace the original two vertical lines; and comparing, by the electronic device, the new vertical line with the adjacent vertical lines, and repeating the above operations until all vertical lines are compared.

4. The method according to claim 1, wherein the step of determining the types of the tables in the table areas according to the extracted horizontal lines and vertical lines comprises:

in accordance with a determination that the number of the horizontal lines in the table area is zero, or the number of the vertical lines is zero, or both of the number of the horizontal lines and the number of the vertical lines are one or more, but the horizontal lines and the vertical lines have no intersection point, determining, by the electronic device, the table as the quasi non-line table; and determining, by the electronic device, the table excluding the quasi non-line tables as the quasi full-line table.

5. The method according to claim 1, wherein the step of determining the structure of the quasi full-line table in the table area comprises:

obtaining, by the electronic device, a set of intersection points of all horizontal lines and all vertical lines in the table area;

determining, by the electronic device, all cells in the table area according to the set of all intersection points; and determining, by the electronic device, row-and-column index information and row-and-column merging information of all cells to obtain the structure of the quasi full-line table.

6. The method according to claim 5, further comprising:
preprocessing, by the electronic device, the determined cells on the horizontal direction and the vertical direction, and performing validity check in combination with the text blocks to remove invalid cells.

7. The method according to claim 5, further comprising:
performing, by the electronic device, verification on the determined cells on the horizontal direction and the vertical direction, checking whether missing cells exist, and if so, supplementing the missing cells.

8. The method according to claim 1, wherein the step of determining the structure of the quasi non-line table in the table area comprises:

clustering the text blocks belonging to the same row in the table area into a text row;

for each text row, determining the number of individual text blocks in the text row and the number of columns of the merged text blocks in the text row according to the text blocks in the text row and the horizontal lines and/or the vertical lines in the table area, taking the sum of the two numbers as the number of columns in the text row, and retaining the text row with the largest number of columns; if there are a plurality of text rows with the largest number of columns, sorting the text rows according to the y coordinates in an order from small to large, performing horizontal projection clustering on the text blocks in the adjacent text rows in sequence, taking the minimum value on the horizontal direction as the left frame of the column interval, taking the maximum value as the right frame of the column interval, taking the upper and lower frames of the table area respectively as the upper and lower frames of the column interval, and determining the clustered column interval; and if there is only one text row with the largest number of columns, directly determining the column interval by using the coordinates of the text blocks in the text row;

for each text row, performing vertical projection on the text blocks in the text row, taking the number of projection areas as the number of rows of the text row, and retaining the text row with the largest number of rows; if there are a plurality of text rows with the largest number of rows, sorting the text rows according to the x coordinates in an order from small to large, sequentially performing vertical projection clustering on the text blocks in adjacent text rows, taking the minimum value on the vertical direction as the upper frame of a row interval, taking the maximum value as the lower frame of the row interval, taking the left and right frames of the table area respectively as the left and right frames of the row interval, and determining the clustered row interval; and if there is only one text row with the largest number of rows, directly perform vertical projection on the text row to determine the row interval; and determining the row-and-column index information and the row-and-column merging information of the cells according to the determined row intervals and column intervals so as to obtain the structure of the quasi non-line table.

9. The method according to claim 8, wherein the step of determining the number of columns of the merged text blocks in the text row comprises:

if one text block covers N text blocks, the N text blocks have no projection overlap area on the horizontal direction and mutually satisfy a certain distance, the number of columns of the merged text block is N'; and/or, if one text block covers N' text blocks, there is projection overlap area among the N' text blocks on the horizontal direction and the projection overlap area exists between every two text blocks, the number of columns of the merged text block is 1; and if one text block is spaced with N" text blocks by lines, and the N" text blocks have no projection overlap area on the horizontal direction and mutually satisfy a certain distance, the number of columns of the merged text block is N".

10. The method according to claim 8, wherein the step of determining row-and-column index information and row-and-column merging information of the cells according to the determined row intervals and column intervals comprises:

analyzing each text row to extract all text blocks in the current text row, performing vertical projection with the row interval of the current text row in sequence to determine the row index information and the row merging information, and performing horizontal projection with the column interval of the current text row to determine the column index information and the column merging information.

11. The method according to claim 1, wherein the step of extracting the text blocks in the table area comprises:

extracting all characters in a PDF page;

clustering adjacent characters into a text block according to character stream sequence and character interval; and extracting the text blocks contained in the table area from all text blocks.

12. An electronic device for parsing tables in a PDF document, comprising:

one or more processors;

memory coupled to the one or more processors; and a plurality of computer instructions stored in the memory, wherein the computer instructions, when executed by the one or more processors, cause the electronic device to perform operations including:

receiving, by the electronic device, the PDF document containing one or more table areas;

extracting, by the electronic device, horizontal lines, vertical lines and text blocks in the table areas;

determining, by the electronic device, the types of tables in the table areas according to the extracted horizontal lines and vertical lines, wherein the type of the table comprises a quasi full-line table and a quasi non-line table;

in accordance with a determination that a table is the quasi full-line table, determining, by the electronic device, the structure of the quasi full-line table in the table area according to the horizontal lines and the vertical lines in the table area with assistance of the text blocks in the table area; and in accordance with a determination that a table is the quasi non-line table, determining, by the electronic device, the structure of the quasi non-line table in the table area according to the text blocks in the table area with assistance of the horizontal lines and/or the vertical lines in the table area, wherein the step of extracting the horizontal lines and the vertical lines in the table area comprises:

extracting all path drawing information in a PDF page and merging the same into lines;

if the coordinate of a line on the y direction is greater than or equal to the y coordinate of the upper frame of the table area and is less than or equal to the y coordinate of the lower frame of the table area, and the coordinate of a left endpoint on the x direction is greater than or equal to the x coordinate of the left frame of the table area and is less than the x coordinate of the right frame of the table area, and the coordinate of a right endpoint on the x direction is greater than the x coordinate of the left frame of the table area and is less than or equal to the x coordinate of the right frame of the table area, collecting the line as a horizontal line; and if the coordinate of a line on the x direction is greater than or equal to the x coordinate of the left frame of the table area and is less than or equal to the x coordinate of the right frame of the table area, the coordinate of an upper endpoint on the y direction is greater than or equal to the y coordinate of the upper frame of the table area, and the coordinate of a lower endpoint on the y direction is less than or equal to the y coordinate of the lower frame of the table area, collecting the line as a vertical line.

13. The electronic device according to claim 12, wherein, before the step of determining the types of the tables in the table areas, the operations further comprise: performing, by the electronic device, deduplication and fusion processing on the extracted horizontal lines and vertical lines.

14. The electronic device according to claim 12, wherein the step of determining the types of the tables in the table areas according to the extracted horizontal lines and vertical lines comprises:

in accordance with a determination that the number of the horizontal lines in the table area is zero, or the number of the vertical lines is zero, or both of the number of the horizontal lines and the number of the vertical lines are one or more, but the horizontal lines and the vertical lines have no intersection point, determining, by the electronic device, the table as the quasi non-line table; and determining, by the electronic device, the table excluding the quasi non-line tables as the quasi full-line table.

15. The electronic device according to claim 12, wherein the step of determining the structure of the quasi full-line table in the table area comprises:

obtaining, by the electronic device, a set of intersection points of all horizontal lines and all vertical lines in the table area;

determining, by the electronic device, all cells in the table area according to the set of all intersection points; and determining, by the electronic device, row-and-column index information and row-and-column merging information of all cells to obtain the structure of the quasi full-line table.

16. The electronic device according to claim 12, wherein the step of extracting the text blocks in the table area comprises:

extracting all characters in a PDF page;

clustering adjacent characters into a text block according to character stream sequence and character interval; and extracting the text blocks contained in the table area from all text blocks.

17. A non-transitory computer readable storage medium comprising computer readable instructions that, when executed by a processor of an electronic device, cause the electronic device to perform operations including:

receiving, by the electronic device, the PDF document containing one or more table areas;

extracting, by the electronic device, horizontal lines, vertical lines and text blocks in the table areas;

determining, by the electronic device, the types of tables in the table areas according to the extracted horizontal lines and vertical lines, wherein the type of the table comprises a quasi full-line table and a quasi non-line table;

in accordance with a determination that a table is the quasi full-line table, determining, by the electronic device, the structure of the quasi full-line table in the table area according to the horizontal lines and the vertical lines in the table area with assistance of the text blocks in the table area; and in accordance with a determination that a table is the quasi non-line table, determining, by the electronic device, the structure of the quasi non-line table in the table area according to the text blocks in the table area with assistance of the horizontal lines and/or the vertical lines in the table area, wherein the step of extracting the horizontal lines and the vertical lines in the table area comprises:

extracting all path drawing information in a PDF page and merging the same into lines;

if the coordinate of a line on the y direction is greater than or equal to the y coordinate of the upper frame of the table area and is less than or equal to the y coordinate of the lower frame of the table area, and the coordinate of a left endpoint on the x direction is greater than or equal to the x coordinate of the left frame of the table area and is less than the x coordinate of the right frame of the table area, and the coordinate of a right endpoint on the x direction is greater than the x coordinate of the left frame of the table area and is less than or equal to the x coordinate of the right frame of the table area, collecting the line as a horizontal line; and if the coordinate of a line on the x direction is greater than or equal to the x coordinate of the left frame of the table area and is less than or equal to the x coordinate of the right frame of the table area, the coordinate of an upper endpoint on the y direction is greater than or equal to the y coordinate of the upper frame of the table area, and the coordinate of a lower endpoint on the y direction is less than or equal to the y coordinate of the lower frame of the table area, collecting the line as a vertical line.

18. The non-transitory computer readable storage medium according to claim 17, wherein, before the step of determining the types of the tables in the table areas, the operations further comprise: performing, by the electronic device, deduplication and fusion processing on the extracted horizontal lines and vertical lines.

* * * * *